Oct. 25, 1932.  M. D. W. SWANSON  1,884,369
VISUAL INFORMATION BOARD
Filed July 17, 1931  4 Sheets-Sheet 1

Inventor.
Martin D. W. Swanson
By Dyrenforth, Lee, Chritton and Wiles
Attys.

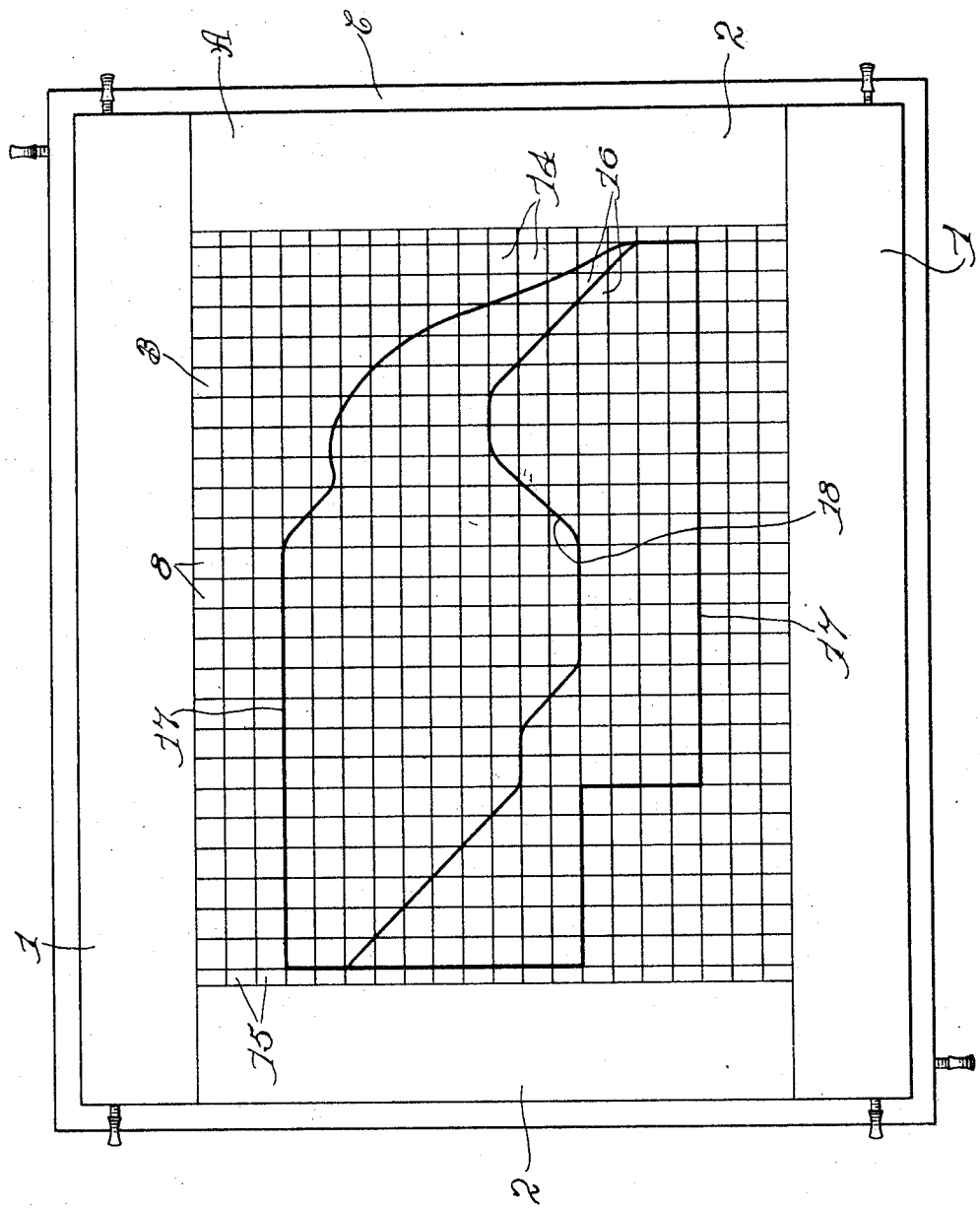

Oct. 25, 1932.  M. D. W. SWANSON  1,884,369
VISUAL INFORMATION BOARD
Filed July 17, 1931  4 Sheets-Sheet 3
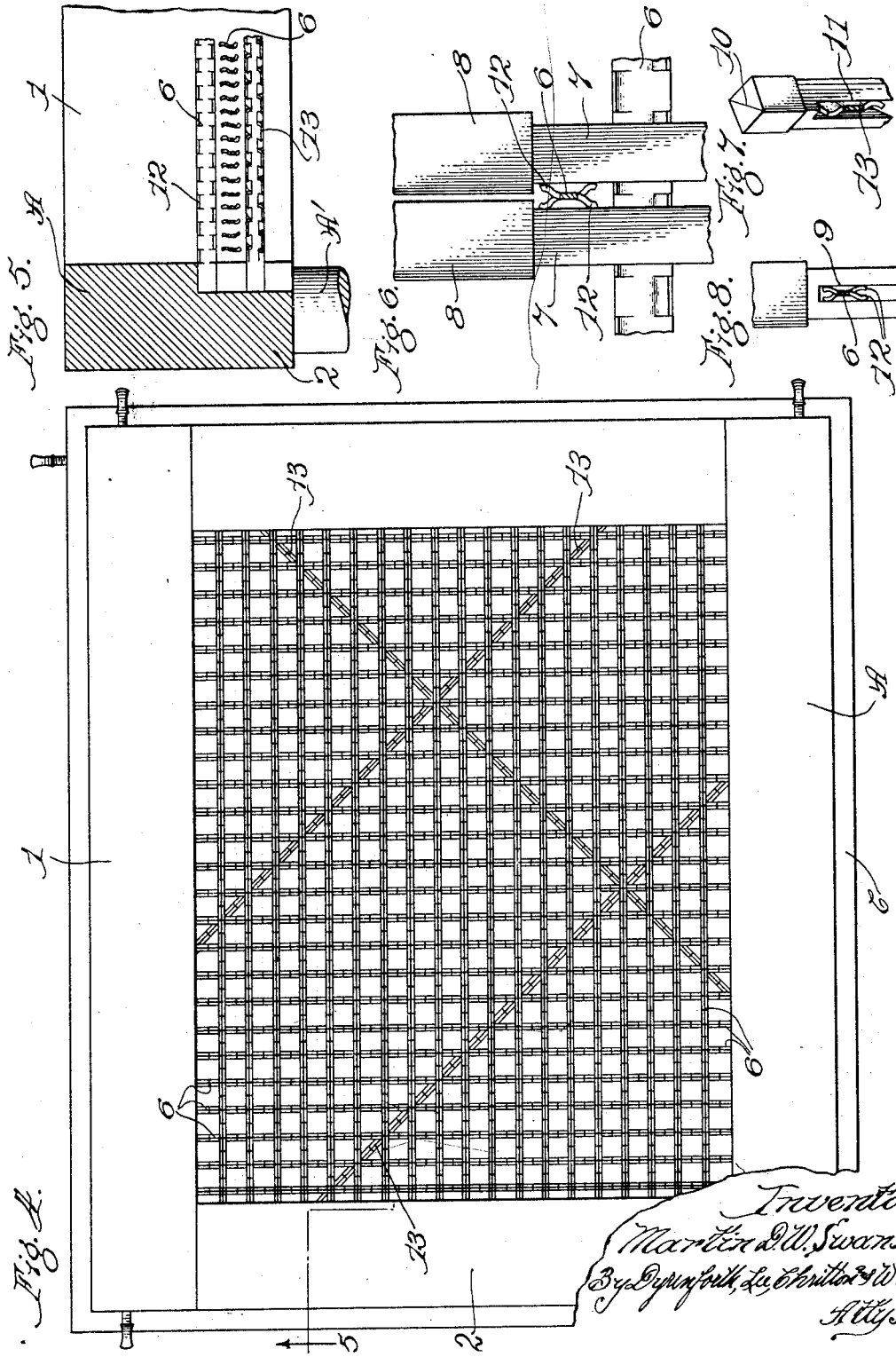

Oct. 25, 1932.  M. D. W. SWANSON  1,884,369
VISUAL INFORMATION BOARD
Filed July 17, 1931  4 Sheets-Sheet 4
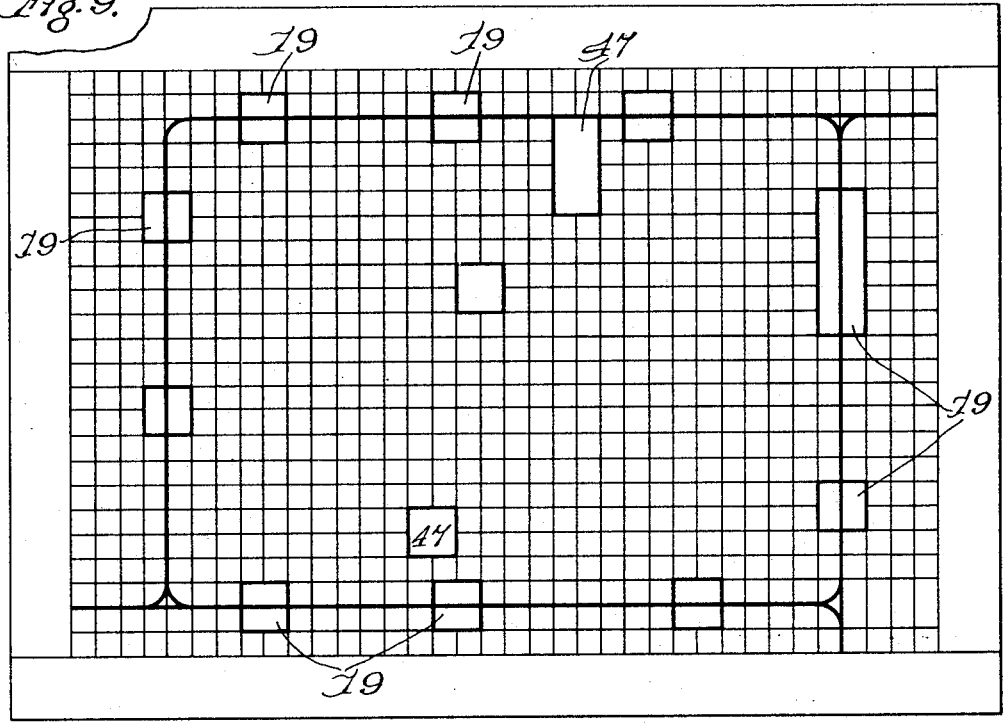
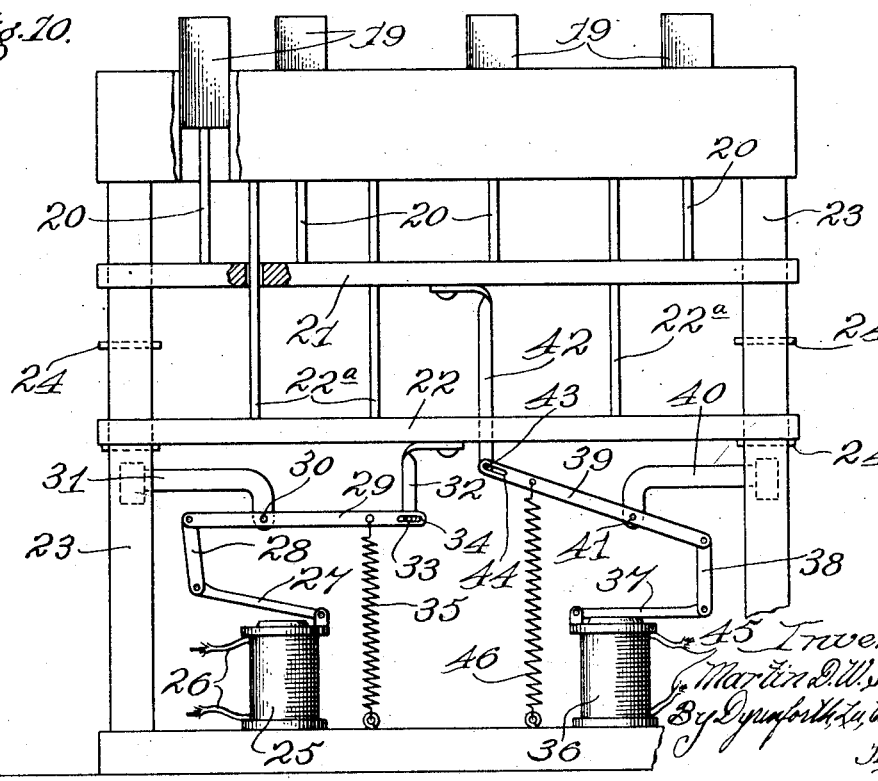

Patented Oct. 25, 1932

1,884,369

UNITED STATES PATENT OFFICE

MARTIN D. W. SWANSON, OF OMAHA, NEBRASKA

VISUAL INFORMATION BOARD

Application filed July 17, 1931. Serial No. 551,520.

This invention relates to a visual information board and more particularly to a board of this character which is equipped with adjustable means for furnishing information readily and in compact form.

One of the objects of the invention is to provide for the recording of human knowledge upon a group of compactly associated units, the units being movably related to expose the desired information. Another object is to provide a three-dimensional map or board composed of slidably related segments, the segments being readily operable to reveal to the eye information which appears upon the sides or faces of the segments. A further object is to provide a group of slidably related blocks or units containing information upon their ends and sides, and means for actuating or extending a plurality of units simultaneously. Another object is to provide a divisible board, the construction of which is such that its original utility may be restored after a desired cross-section has been obtained. Other objects and advantages will appear as the specification proceeds.

Figure 1:
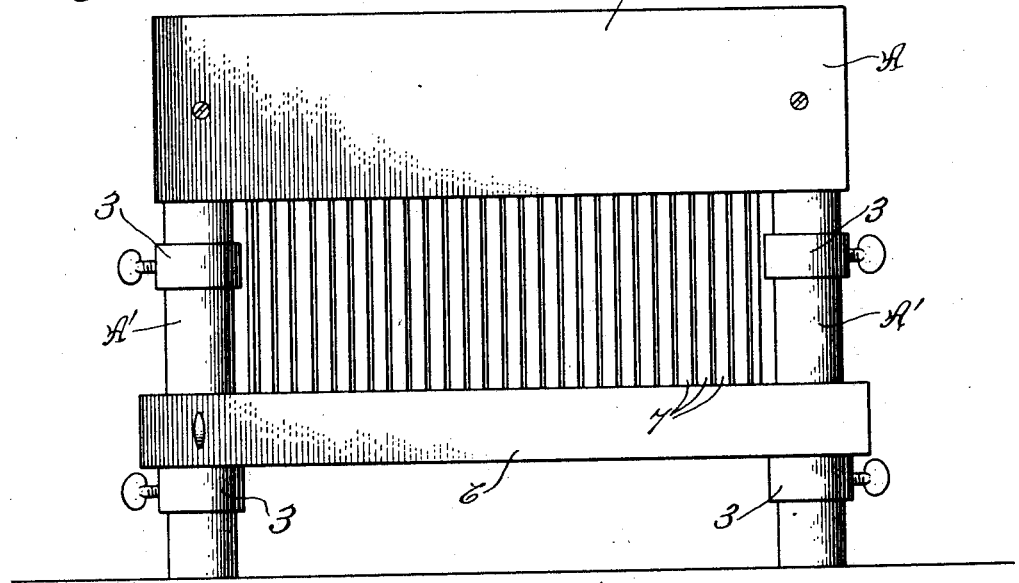
Figure 2:
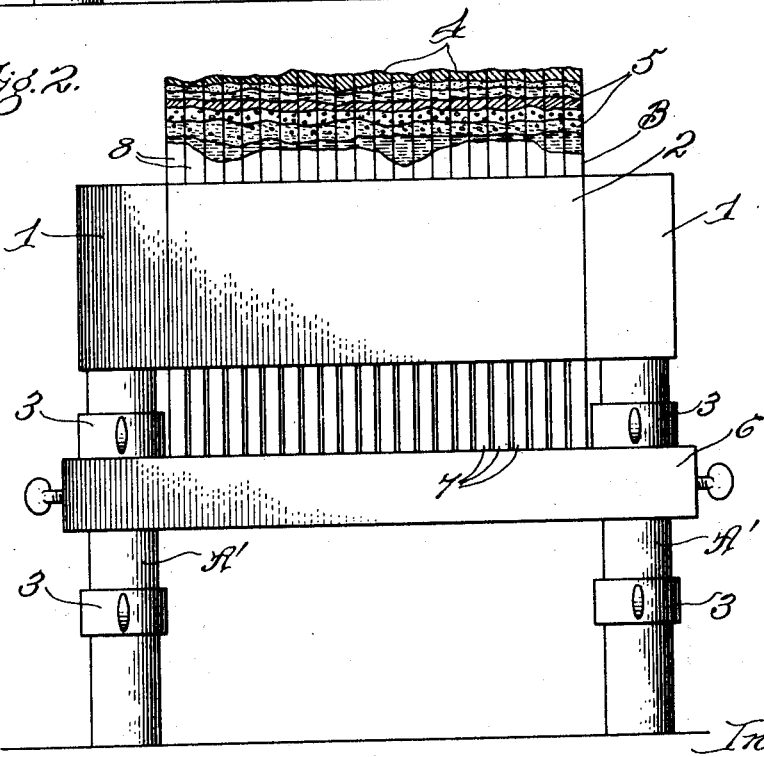

The invention is fully described in the following specification and shown in the accompanying drawings, in which:

Figure 1 is a side view in elevation of apparatus illustrating one embodiment of my invention, the platen or unit support being shown in lowered position; Fig. 2, a view similar to Fig. 1, but showing the platen or unit support in elevated position; Fig. 3, an enlarged plan view showing the tops of the blocks or units supported in a frame; Fig. 4, an enlarged plan view of the apparatus, the blocks having been removed; Fig. 5, an enlarged detail sectional view, the section being taken as indicated at line 5 of Fig. 4; Fig. 6, an enlarged detail view of blocks and spring friction members associated with the blocks; Fig. 7, a detail view of a block having a diagonal slot therethrough adapted to receive spring friction members; Fig. 8, an enlarged detail view of a block having a transverse slot therethrough; Fig. 9, a plan view of apparatus constituting a modification of my invention; and Fig. 10, a broken end view of the modification shown in Fig. 9.

In the embodiment illustrated in Figs. 1 to 7 inclusive, A represents a frame supported upon cylindrical posts A', B represents a plurality of blocks slidably held within frame A, and C represents a platen or support upon which the blocks B rest.

The frame A may be of any suitable construction. In the illustration given, it comprises two side pieces 1 and two ends 2. Both the end walls 2 and side walls 1 are relatively wide and serve to hold the blocks B in accurate and compact alignment.

The platen C is preferably perforated near its four corners to receive the cylindrical posts A'. Adjustable stop members 3 may be positioned at points where it is desired to stop the platen C.

The blocks or elongated units B may be of any suitable construction. They may be formed of wood, of metal, composition material, etc. The top ends of the blocks, as well as the upper side portions thereof, are adapted to have information placed upon them in any suitable manner. For example, as illustrated in Fig. 2, the upper end portions 4 of the blocks may be cut, molded, or fashioned in any suitable way to resemble the contour of a particular locality. The character of the subsurface formation, the clay, sand, rock strata, etc., is shown on the sides of the blocks, as indicated at 5.

In order to maintain the blocks in accurate alignment and to permit one block to be moved independently of the other, and also to prevent abrasion of the matter printed, painted, or otherwise formed upon the upper portions of the block, I prefer to cut away the blocks at an intermediate point so that they may be engaged by friction bands 6.

As illustrated more clearly in Figs. 6, 7 and 8, the blocks may be cut away along their sides so as to form a reduced shank portion 7 which extends below the upper or enlarged portion 8 which is adapted to receive the printed, painted, etc. matter. Also, the blocks may be provided with intermediate or transverse slots 9 through which friction bands 6 may be extended. With this arrangement, half size blocks may be employed along with full size blocks and the spacing for the bands is provided for by intermediate slots 9. I also employ split blocks. As shown in Fig. 7, a block is divided along the diagonal line 10 and is provided with a diagonal slot 11 which extends between the two block halves.

Any suitable form of friction band 6 may be employed. In the illustration given, a metal band is slitted at regular intervals and the slitted portions are bent so as to form lateral projecting arms 12. Preferably, the ends of the arms are turned inwardly so as to prevent the edges from cutting into the blocks. As shown more clearly in Figs. 4 and 5, the band 6 may be secured in the side and end frame members 1 and 2 so as to extend longitudinally and transversely of the blocks, the transverse bands being spaced below the longitudinal bands. As shown more clearly in Fig. 6, the projecting spring arms 12 engage the adjacent walls of blocks and serve to hold the upper information-carrying portions slightly apart. At the same time, the blocks may be moved longitudinally of each other, the friction of the spring arms being just sufficient to prevent collapsing of the blocks or abrasion of the upper adjacent portions 8.

In addition to the transverse and longitudinal spring band 6, I prefer to employ oblique friction bands 13. Such bands are adapted to extend between blocks such as the blocks divided diagonally at 10, as shown in Fig. 7.

The blocks may be formed in any suitable size or shape. In the illustration given in Fig. 3, regular square blocks 14 are shown, a rectangular or half size block 15 is shown. Also, diagonally divided blocks 16 are shown. With these blocks, it is possible to make out an area resembling a map of Nebraska, the line 17 indicating the State boundary line. Also, it is possible to make out the course of a river, indicated by the line 18. The diagonally divided blocks are held in position by diagonal friction bands 13, as well as by the longitudinal and transverse bands. By employing blocks provided with intermediate slots, as illustrated in Fig. 8, half size blocks or other fractional blocks may be used.

Referring again, by way of illustration, to Fig. 3, the tops of the blocks comprised within the boundary line 17 may be cut away or otherwise fashioned to resemble the contour of the State, as illustrated also in Fig. 2, and the aggregate of the blocks may resemble the map of Nebraska. On the side portions 8 of the various blocks comprised within the boundary line 17 may be printed, painted, or otherwise reproduced the character of the subsurface—sand, rock, clay, strata, etc.—at the points in the State represented by the various blocks.

One desiring to secure information as to any particular point in Nebraska, may locate the point upon the map and may then manipulate one or more of the blocks to expose the information shown on the sides of the blocks. In this manner, a three-dimensional picture of a particular section in a State may be visually presented.

Instead of having the sides of the blocks represent a cross-sectional map of a section, other forms of information may be given. Statistics relating to a particular locality may be shown along the upper side portions of the block or blocks representing that locality.

In the operation of the blocks, any suitable method of exposing the information surfaces may be employed. Some of the blocks may be depressed, leaving the remaining blocks in their raised position, or the surfaces of the desired block or blocks may be exposed by simply raising one or more blocks above the other blocks.

In the embodiment illustrated in Figs. 1 and 2, a movable platen C may be used to raise the entire group of blocks. When the platen is lowered to a desired point, any one or more of the blocks may be depressed to expose the desired information on the sides of the adjacent blocks which remain in elevated position. The stops 3 upon the cylindrical post A' are adjustable; also, the screw equipped platen C may be releasably locked upon the legs A'. With the blocks in elevated position, the platen C may be lowered, and any one of the blocks raised above the other, or lowered, as already mentioned.

Instead of manipulating the blocks by hand, automatic means may be employed for this purpose. Mechanical, pneumatic, electrical, and other forms of actuating means may be used. In the illustration given in Figs. 9 and 10, an electrical device is employed to reciprocate the information blocks. The modification also illustrates the fact that a number of the blocks may be simultaneously exposed.

As shown more clearly in Fig. 10, a plurality of blocks 19 are rigidly supported upon plungers 20 and 22a which in turn are carried by vertically guided platens 21 and 22. The platens are apertured at their corners to receive cylindrical posts 23. Suitable stops 24 may be employed.

The means for reciprocating the platens 21 and 22, as illustrated in Fig. 10, are electromagnetic means. An electro-magnet 25 is shown provided with electric wires 26 which lead to any suitable switch. A link arm 27 is shown pivotally connected to the casing of the magnet and is connected by a short arm 28 to one end of a pivoted lever 29. The lever 29 is pivotally connected at 30 to a fixed projection 31. A projecting arm 32 is secured to the lower wall of platen 22 and is provided with a pin 33 received within slot 34 at one end of the lever 29. A spring 35 connects the bar 29 to the base of the apparatus, and normally draws the outer end of bar 29 and the short arm 32 in a downward direction. A similar electro-magnet 36 actuates an arm 37, connecting link 38 and pivoted lever 39, the lever 39 being pivotally connected to projection 40 at 41. A long arm 42 connects platen 21 to the outer end of lever 39, the arm 41, being provided with a pin 43 which engages a slot 44 in one end of the lever 39. Electric wires 45 lead from the electro-magnet 36 to a switch of any desired type.

When the switch is closed, as illustrated in Fig. 10 with respect to electro-magnet 36, the arm 37 is drawn downwardly by the magnet and the outer end of lever 39 is forced upwardly, thus raising the long arm 42 and platen 21 which is supported thereon. Plungers 20, carrying a plurality of blocks 19 are raised to expose the information carried on the sides of blocks 19. When the switch is opened, the weight of the platen and the blocks supported thereon, cooperating with the tension of spring 46, lower the platen 21 and thereby the blocks 19. When the switch which controls wires 26 is closed, a similar operation takes place with respect to magnet 25 and arm 32, together with platen 22, is raised, thus elevating the blocks carried by plungers 22a.

Assuming that the blocks 19, which are supported upon plungers 20 represent on their top end surfaces railway stations, and assuming that blocks 47, which are supported upon plungers carried by platen 22 represent on their top ends hotels, the operator may secure information relating to the stations and hotels, which information is placed upon the sides of the respective blocks, by closing the switch controlling electro-magnet 25 or the switch controlling electro-magnet 26.

Any number of platens may be employed, and any number of electro-magnets may be used to actuate the platens. By closing a switch which causes a particular platen to be raised, the information carried on the sides of the blocks supported by the platen is made accessible.

Any suitable means for recording statistics or reproducing maps, sketches, etc., upon the tops, ends, and sides of the blocks may be employed. For example, a map may be placed upon the top of a large number of blocks and secured thereto. Then the map may be divided so that the top end portion of each block is covered by a portion of the map. Any satisfactory method, however, may be employed for this purpose and for the purpose of placing the information, etc., upon the sides of the blocks.

Any suitable means for arranging information in compact and accessible form on or in the blocks may be employed. If desired, the blocks may be hollow and equipped with compartments in which sheets or folded webs containing information may be used.

The foregoing detailed description has been given for clearness of understanding only, and no unnecessary limitations should be understood therefrom, but the appended claims should be construed as broadly as permissible in view of the prior art.

I claim:

1. In apparatus of the character set forth, a frame, and a plurality of elongated polygonal blocks each slidably related, said blocks bearing information on their top end and side portions and said side portions being exposed when one or more of said blocks are projected above the others.

2. In apparatus of the character set forth, a frame, a plurality of elongated polygonal blocks each slidably supported in said frame, and a vertically adjustable platen carried by the frame and adapted to engage the lower ends of said blocks, said blocks bearing information on their top end and upper side portions and said upper side portions being exposed when one or more of said blocks are projected above the others.

3. In apparatus of the character set forth, a frame, a plurality of polygonal blocks each being slidably supported in said frame and capable of being projected above the other blocks, said blocks bearing information on their top and side surfaces, and spring friction means carried by said frame and engaging said blocks.

4. In apparatus of the character set forth, a frame, a plurality of blocks each slidably supported therein, said blocks having their lower portions cut away to provide recesses, and friction elements housed within said recesses and secured to said frame, said friction elements engaging the side walls of said blocks.

5. In apparatus of the character set forth, a frame, a plurality of slidably-mounted information bearing units, and transverse and longitudinal friction bands carried by said frame and engaging walls of said units, each unit being individually reciprocable to project it above the other units.

6. In apparatus of the character set forth, a frame, and a plurality of elongated polygonal blocks slidably supported in said frame, each block being separately reciprocable to project it above the other blocks, said blocks bearing map sections upon their top end portions which form, in the aggregate, a continuous map, and said blocks bearing also information on their side portions.

7. In apparatus of the character set forth, a frame, and a plurality of elongated polygonal blocks slidably supported in said frame, said blocks having their top portions shaped so as to form, in the aggregate, a continuous relief map, each of said blocks being reciprocable to expose the sides thereof above the other blocks, and said blocks having also information carried on their sides.

8. In apparatus of the character set forth, a frame, and a plurality of slidably-related blocks supported in said frame, each block being separately reciprocable, said blocks bearing on their sides map sections which form, in the aggregate, along a given straight line, a continuous sectional sub-surface map.

9. In apparatus of the character set forth, a frame, a plurality of blocks slidably supported therein, each block being separately reciprocable, said blocks having information on their top and side portions, and means carried by the frame for simultaneously actuating said blocks.

10. In apparatus of the character set forth, a frame, a plurality of slidably-related blocks supported in said frame, each block being individually slidable with respect to the other blocks, said blocks having information on their top and side portions, and means carried by the frame for simultaneously and selectively actuating certain of the blocks to expose the information on the sides thereof.

11. In apparatus of the character set forth, a frame, a plurality of blocks slidably supported in the frame, each block being separately slidable, said blocks having information on their top and side portions, and electro-magnetic means supported by said frame for moving a predetermined number of blocks to expose the information on the sides thereof.

12. A visual information board comprising, a frame, and a plurality of slidably supported blocks in said frame, each block being separately reciprocable, said blocks having their top end portions provided with map sections presenting in the whole a continuous map, said blocks having also information recorded upon their sides, said information upon the sides of the blocks being directly related to the map section carried upon the top end of the blocks.

13. A visual information board comprising, a frame, a plurality of slidably supported blocks in said frame, each block being separately slidable, said blocks having their top end portions provided with map sections presenting in the whole a continuous map, said blocks having also information recorded upon their sides, said information upon the sides of the blocks being directly related to the map section carried upon the top end of the blocks, and means for simultaneously actuating a certain related group of said blocks to expose the information on the sides thereof.

MARTIN D. W. SWANSON.